United States Patent
Iwamatsu et al.

[11] Patent Number: 5,737,649
[45] Date of Patent: Apr. 7, 1998

[54] DETECTING CIRCUIT AND METHOD FOR DETECTING POWER INTERRUPTION IN A CAMERA

[75] Inventors: Yoshiyuki Iwamatsu; Isamu Ishii; Shinichi Endo, all of Yotsukaido, Japan

[73] Assignee: Seiko Precision Inc., Japan

[21] Appl. No.: 419,815

[22] Filed: Apr. 11, 1995

[30]  Foreign Application Priority Data

Apr. 12, 1994 [JP] Japan .................... 6-073356

[51] Int. Cl.$^6$ .................... G03B 7/26
[52] U.S. Cl. .................... 396/277; 396/301
[58] Field of Search .................... 354/484, 289.12; 396/301, 302, 303, 304, 277, 278, 279

[56]  References Cited

U.S. PATENT DOCUMENTS

| | | | |
|---|---|---|---|
| 4,783,674 | 11/1988 | Ishikawa et al. | 354/289.1 |
| 4,978,982 | 12/1990 | Ishikawa et al. | 354/21 |
| 5,079,585 | 1/1992 | Yamada | 354/484 |
| 5,198,850 | 3/1993 | Saegusa | 354/412 |

OTHER PUBLICATIONS

George E. Friend, Understanding Data Communications, Howard W. Sams & Company, p. 176, 1988.

*Primary Examiner*—Safet Metjahic
*Assistant Examiner*—Eric Nelson
*Attorney, Agent, or Firm*—Adams & Wilks

[57]  ABSTRACT

A camera powered by a battery has a first memory area for storing first data used in operating the camera and for retaining the first data irrespective of a power source interruption in the camera, and a second memory area powered by the battery for storing second data which is dependent upon the first data. A power interruption in the camera, such as occurs when the battery is exhausted or replaced, is detected by comparing the first data stored in the first memory area with the second data stored in the second memory area. After detection of a power interruption, the camera is initialized and the first data stored in the first memory area is then copied into the second memory area. Since the first memory area and the second memory area are compared each time the camera is activated, the state of the battery can be reliably checked.

4 Claims, 8 Drawing Sheets

F I G. 7
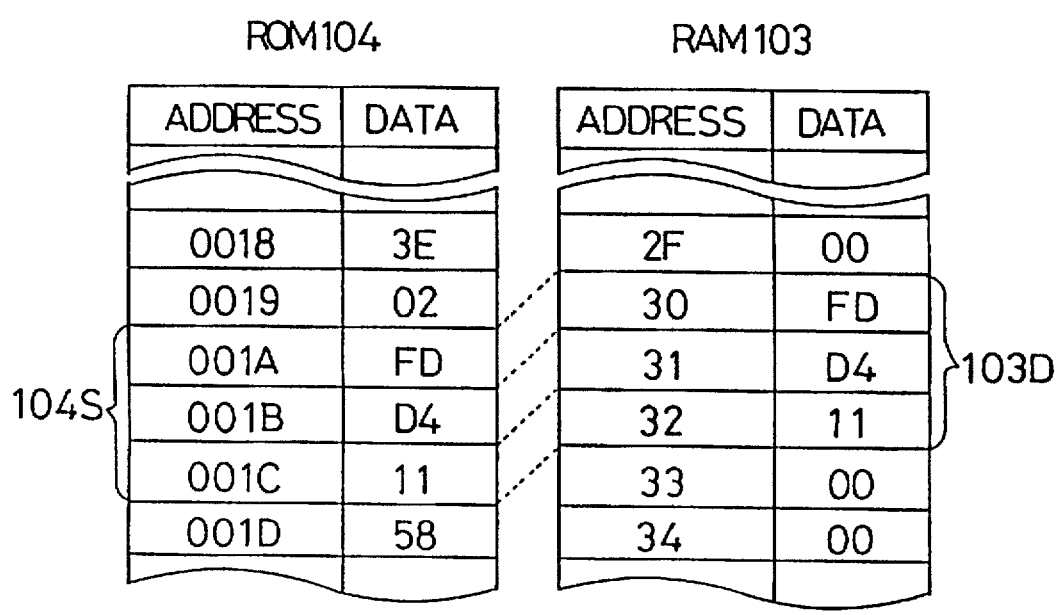

DETECTING CIRCUIT AND METHOD FOR DETECTING POWER INTERRUPTION IN A CAMERA

FIELD OF THE INVENTION

The present invention relates generally to a camera, and more particularly to a battery-powered camera capable of detecting a power interruption in the camera, such as when the battery is replaced.

BACKGROUND OF THE INVENTION

In the prior art, a number of detection methods for detecting a power interruption in a camera, such as when the power source battery has been replaced, have been proposed.

FIG. 6 shows a block diagram of a conventional camera. A battery 101 supplies power to each of the circuits of the camera. A control circuit (hereinafter referred to as CPU) 102 generally controls each circuit of the camera. A rewritable volatile memory (hereinafter referred to as RAM) 103 is used by the CPU 102 for calculations and temporary storage. A non-rewritable (read-only) nonvolatile memory (hereinafter referred to as ROM) 104 stores information such as control programs and pertinent data for performing each of the operations of the camera. A main switch 105 activates the CPU 102. When the main switch 105 is switched from the OFF position to the ON position by a camera user, such as a photographer, the CPU 102 executes an initialization program previously stored in the ROM 104.

As shown in FIG. 7, the contents of an area 104S of the ROM 104 are copied to an area 103D in the RAM 103 at the end of the initialization program. When copying is performed once, since for subsequent programs the area 103D performs only read out, in normal usage there is no change to the area 103D in the RAM 103.

Next, a description will be given of the case when the camera user replaces the battery 101 or for some reason the power supplied to the camera by the battery 101 is interrupted. As shown in FIG. 8, although the content of each bit of the RAM 103 is ensured when the input voltage is equal to or greater than a lowest operating voltage VC, it generally becomes unstable at a voltage thereunder, and in particular changes in all the bits to either 1 or 0 are common with the passing of time. Also, it normally cannot be predicted in which addresses in the RAM 103 such changes will occur. For this reason the CPU 102 compares the area 104S of the ROM 104 and the area 103D of the RAM 103 at the beginning of the initialization program. If the contents of the area 104S and the area 103D differ, it is determined that either the battery has been replaced prior to the switching of the main switch 105 to the ON position or that the power supplied to the camera by the battery 1 has been interrupted for some reason, whereupon the CPU 2 performs an initialization process with respect to each mechanism and circuit of the camera.

However, as previously described, since it cannot be predicted from which addresses changes in the content of the RAM 103 will occur in a case where the supply of power is interrupted, even if part of the RAM 103 is rewritten, there are cases where the initialization process is not performed because the area 103D accidentally cannot be rewritten, causing the occurrence of misoperations.

SUMMARY OF THE INVENTION

The present invention provides a detecting circuit for detecting a power source interruption in a camera which overcomes the aforementioned drawbacks with conventional cameras. The detecting circuit comprises a power source for powering the camera, first storage means for storing first data used in operating the camera and for retaining the first data irrespective of a power source interruption in the camera, second storage means powered by the power source for storing second data, the second data being dependent upon the first data, and detecting means for detecting a change in the second data indicative of a power interruption in the camera.

In one embodiment, the detecting circuit includes initialization means for initializing the camera in accordance with an output of the detecting means, and copying means for copying the first data stored in the first storage means into the second storage means. The detecting means comprises comparing means for comparing the first data stored in the first storage means with the second data stored in the second storage means.

In another embodiment, the detecting circuit includes initialization means for initializing the camera in accordance with an output of the detecting means, and means for calculating a check sum of the first data stored in the first storage means and storing the check sum in the second storage means. The means for calculating the check sum includes means for performing a cyclic redundancy check, and the detecting means comprises comparing means for comparing the check sum of the first data stored in the first storage means with the second data stored in the second storage means.

BRIEF DESCRIPTION OF THE DRAWINGS

The foregoing summary, as well as the following detailed description of the preferred embodiments of the invention, will be better understood when read in conjunction with the accompanying drawings. For the purpose of illustrating the invention, there is shown in the drawing embodiments which are presently preferred. It should be understood, however, that the invention is not limited to the precise arrangements and instrumentalities shown. In the drawings:

FIG. 7 is a drawing showing the content of a memory; and

DETAILED DESCRIPTION OF THE PREFERRED EMBODIMENTS

Figure 1:
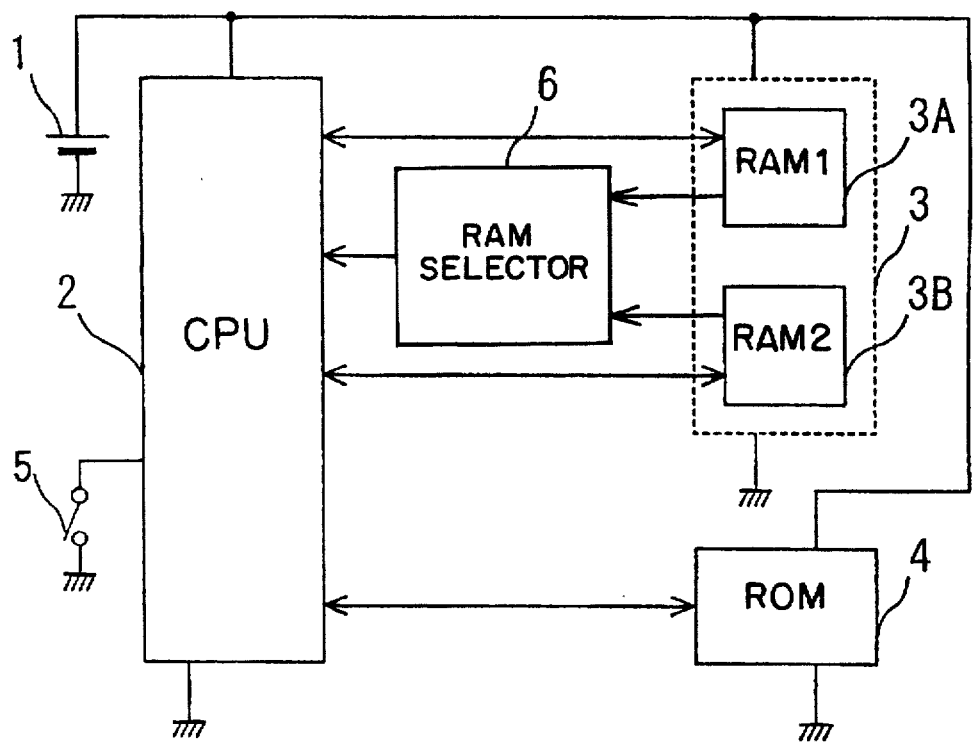
FIG. 1 is a block diagram showing a first embodiment of a camera according to the present invention.

A first embodiment of a camera according to the present invention will be explained with reference to FIG. 1. A power source, such as a battery 1, supplies power to each of the circuits of the camera. A CPU 2 is powered by the battery 1 and generally controls each of the circuits of the camera. A ROM 4 stores information such as control programs and pertinent data for performing the operations of the camera.

Storage means, such as, for example, a RAM 3, has a first RAM area 3A, denoted RAM 1, and a second RAM area 3B, denoted RAM 2, which are used for calculations and temporary storage by the CPU 2. A RAM selector 6, such as a multiplexer, is provided for alternate selection of the first and second RAM areas 3A,3B by the CPU 2. A main switch 5 is provided for activating the CPU 2. When the switch 5 is switched by a user, such as a photographer, from the OFF position to the ON position, the CPU 2 executes an initialization program previously stored in the ROM 4.

Figure 2:
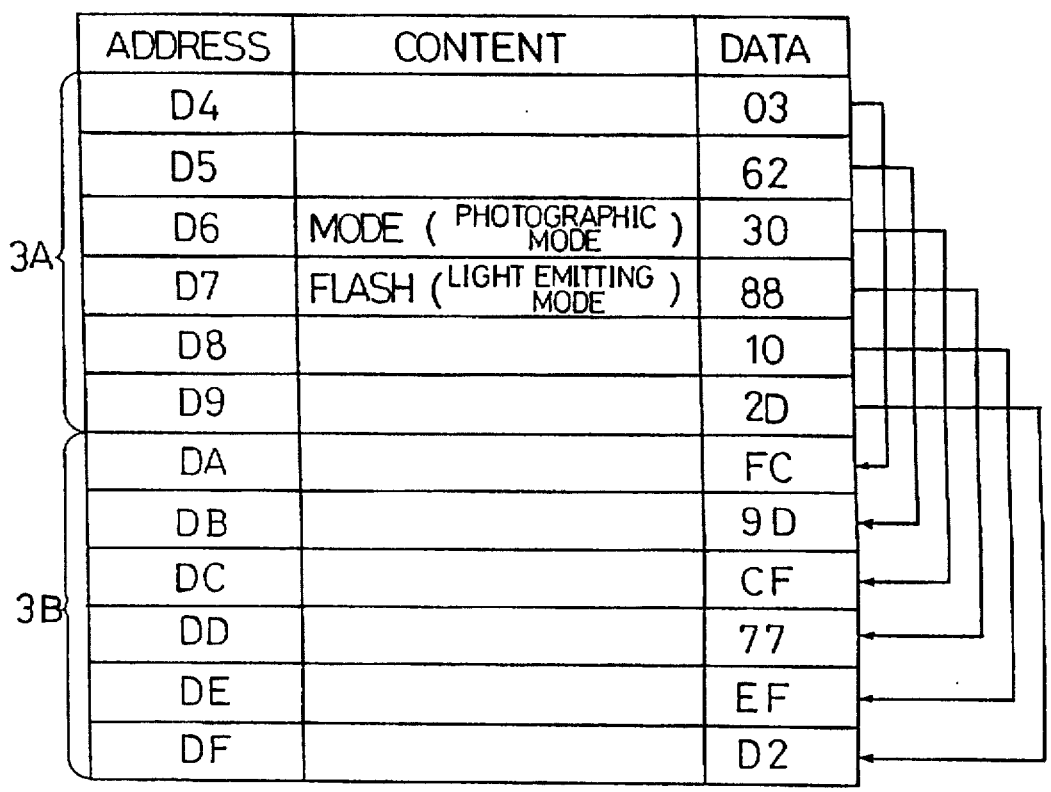
FIG. 2 shows the content of a RAM of the first embodiment of the present invention.

FIG. 2 shows the content of the RAM 3. The first RAM area 3A and the second RAM area 3B are assigned different addresses of the RAM 3 (all addresses and data will hereinafter be expressed in hexadecimal). The first RAM area 3A is assigned an address D4 through an address D9, and the second RAM area 3B is assigned an address DA through an address DF. By this arrangement, a complement of the address D4 is written into the address DA, a complement of the address D5 is written into the address DB, . . . and a complement of the address D9 is written into the address DF. A numerical value or flag indicating the state of each section of the camera is stored in the first area 3A and such data is not destroyed by the normal operation of the CPU 2.

When the photographer switches the main switch 5 to the ON position, the CPU 2 first takes the exclusive-OR of the data &h03 ("&h" is a code indicating that it is hexadecimal) of the address D4 of the first RAM area 3A and data &hFC of the address DA of the second RAM area 3B, and confirms whether or not this is equal to &hFF. Next, upon sequentially comparing data &h62 of address D5 and data &h9D of address DB, . . . and data &h2D of address D9 and data &hD2 of address DF, if the exclusive-OR of each respective pair compared are equal to &hFF, it is determined that the battery has not been replaced. If at least one combination is not equal to &hFF, it is determined that the battery has been replaced, and the CPU 2 enters an initialization routine. Thus, by comparing each respective pair of data, a change in the data in the second RAM area is detected which is indicative of a power interruption in the camera.

In the initialization routine, an initial value is substituted in the data of each section of the camera. Next, an operation of inverting and copying all of the data of the first RAM area 3A to the second RAM area 3B is performed. Thereafter, the data of the first RAM area 3A and the second RAM area 3B are stored and, since they are not written to during normal operation, rewriting of these data is not performed unless the battery has been exhausted or replaced.

Figure 3:
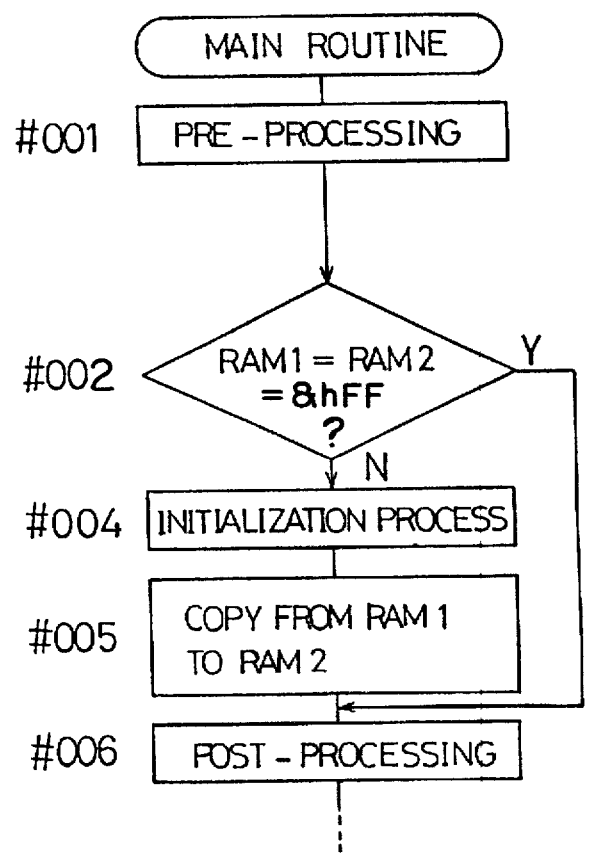
FIG. 3 is a main flow chart illustrating the operation of the first embodiment of the present invention.

FIG. 3 shows a flowchart of the aforementioned process. Upon the main switch 5 being switched to the ON position and a main routine being called, the CPU 2 first performs pre-processing for activating the camera (#001). Specifically, this is a process such as a battery check, etc. Next, the exclusive-OR is taken with respect to the address D4 through the address D9 of the first RAM area 3A and the address DA through the address DF of the second RAM area 3B (#002). If the exclusive-OR of each respective pair compared are equal to &hFF, it is determined that the battery has not been replaced or that the power supplied by the battery has not been interrupted, and the process jumps to #006 for post-processing. If at least one combination is not equal to &hFF, the initialization operation for initializing the circuits of the camera is performed (#004). Then the contents from address D4 through address D9 of the first RAM area 3A are each inverted and copied into address DA through address DF, respectively, of the second area 3B (#005). Upon completion of the above operations, post-processing is performed and the CPU is placed on standby (#006). Post-processing is, for example, a process for driving the lens barrel of the camera to an initial position.

A second embodiment of the present invention in which there is provided a method of utilizing a well-known check sum will be described below.

Address DA is a 1-byte region for storing the check sum. Here a CRC-16 check sum is written in. When a photographer switches the main switch 5 to the ON position, the CPU 2 first calculates the CRC characters (hereinafter referred to as CRCCs) of the data from the address D4 to the address D9 of the first RAM area 3A and then compares the result thereof with the check sum data of address DA. If it is found that the contents of the CRCCs and the address DA are equal, it is determined that the battery has not been replaced or that the power supplied from the battery has not been interrupted. However, if the contents are not equal, it is determined that the battery has been replaced or the power supply interrupted, and the CPU 2 enters an initialization routine. Thus, by comparing the CRCCs of the data from the address D4 to the address D9 with the check sum data of address DA, a change in the check sum of address DA is detected which is indicative of a power interruption in the camera.

In the initialization routine, an initial value is substituted in the data of each section of the camera. Lastly in the initiatization routine, an operation of calculating a check sum of the data of the first RAM area 3A and copying or storing it into the address DA of the second RAM area 3B is performed. Thereafter, the data of the first area RAM 3A and the second RAM area 3B are stored and, since they are not written to during normal operation, rewriting of these data is not performed unless the battery has been exhausted or replaced.

Figure 4:
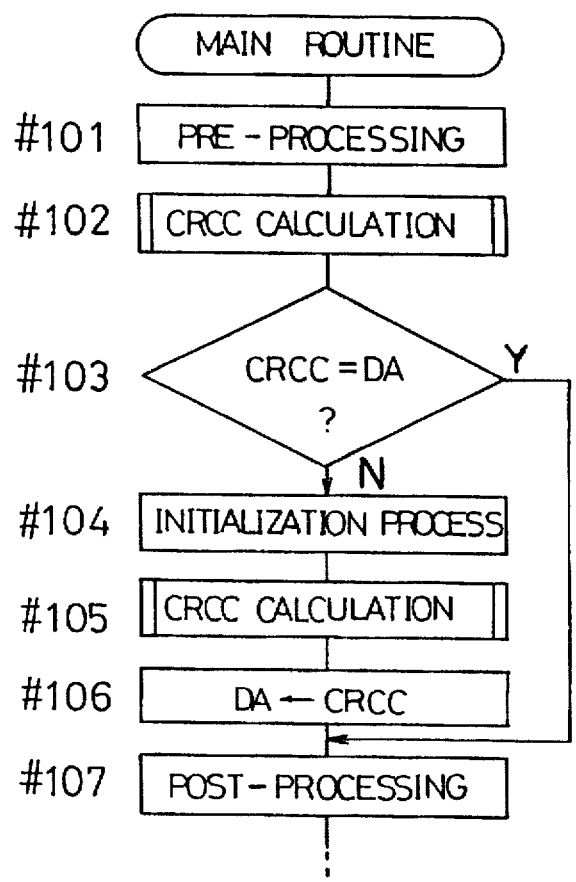
FIG. 4 is a main flow chart illustrating the operation of a second embodiment of the present invention.

FIG. 4 shows a flow chart of the aforementioned process. Upon the main switch 5 being switched to the ON position and the main routine being called, the CPU 2 first performs pre-processing for activating the camera (#101). Specifically, this is a process such as a battery check, etc. Next, the CPU 2 calculates CRCCs with respect to the address D4 to the address D9 (#102), and compares them to the content of the address DA (#103). If the contents of the CRCCs and the address DA are equal, it is determined that the battery has not been replaced, and the process jumps to #107 for post-processing. However, if the contents are not equal, the initialization operation for initializing the circuits of the camera is performed (#104). Then the CRCCs with respect to address D4 to address D9 are calculated (#105) and copied or stored into address DA (#106). Upon completion of the above operations, post-processing is performed and the CPU is placed on standby (#107). Post-processing is, for example, a process for driving the lens barrel of the camera to an initial position.

Figure 5:
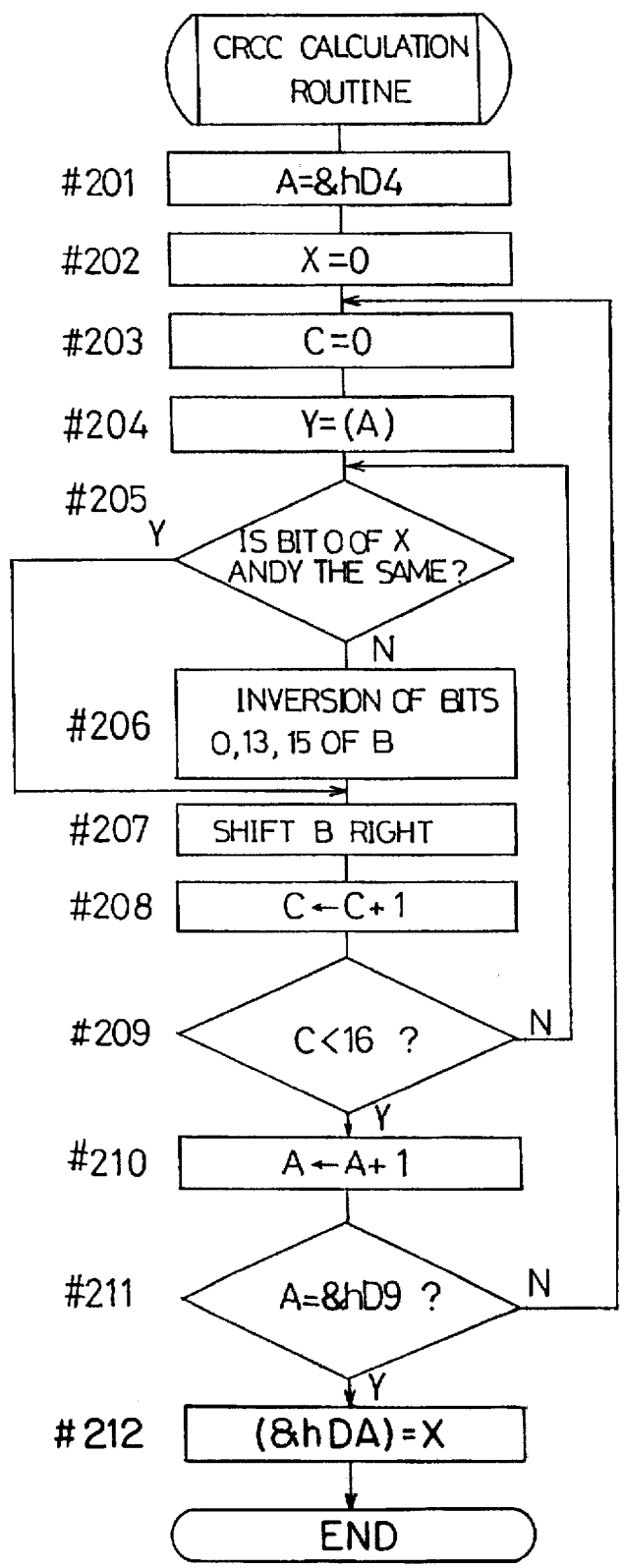
FIG. 5 is a flow chart showing a method for obtaining a CRC check character of the second embodiment of the present invention.
Figure 6:
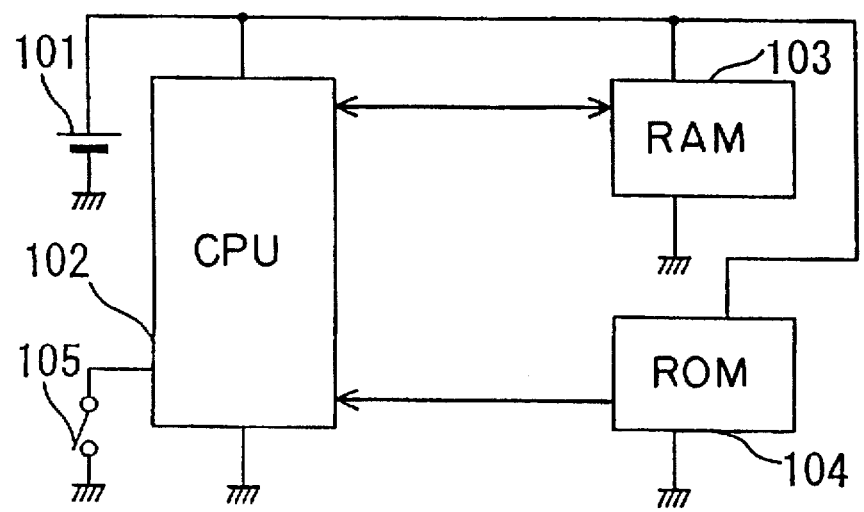
FIG. 6 is a block diagram showing a prior art camera.
Figure 8:
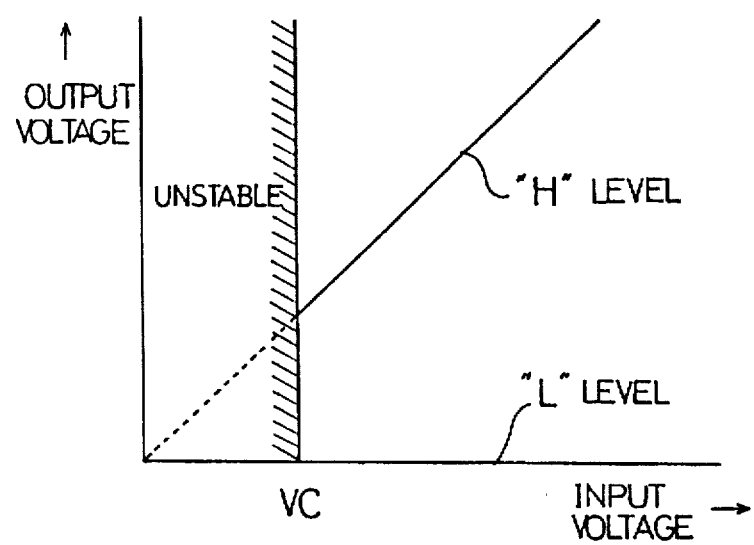
FIG. 8 is a drawing showing a power source voltage characteristic of a memory.

Next, the CRC check subroutine of #102 and #105 in FIG. 4 will be explained with reference to the flow chart shown in FIG. 5. A, C, X, and Y shown in the flow chart are registers incorporated in the CPU 2. A and C are each registers of 8 bits length while X and Y are each registers of 16 bits length in which calculations such as arithmetic operations, logical operations or bit calculations are possible. Register A is an address pointer for the first RAM area 3A, register C is a loop counter, and registers X and Y are registers for producing CRCCs.

First, an address initial value D4 is substituted in register A (#201). Next, 0 is substituted in register X (#202) and 0 is substituted in register C (#203). Next, the content of the address indicated in address A is substituted into address Y (#204). Then the bits 0 of the register X and the register Y are compared (#205) and if it is determined that they are both equal, the process jumps to #207. If it is determined that they are not equal, bits 0, 13 and 15 of register X are inverted (#206). Subsequently, the contents of register X is right-shifted (half position) (#207) and 1 is added to C (#208). As a result, if C is less than 16, the process jumps to #205 (#209), and if C is 16 or more, 1 is added to A and the next address is indicated (#210). Here, if A does not equal address DA, the process jumps to #203, and if it does reach address DA the value of register X is substituted in the address DA (#212) and the process returns to the main routine (#211).

In the present embodiment, although the check sum is a CRC-16 method, it will be appreciated by those skilled in the art that another CRC method or a normal check sum may also be used.

As will also be understood by those skilled in the art, although calculation of the check sum in the present embodiment is performed by software, circuits which perform the same process may be provided to perform the process by hardware.

According to the structure of the present invention, since in the first embodiment the first RAM area 3A and the second RAM area 3B, which is an inversion of the first RAM area 3A, are both checked when the camera is activated, the battery is reliably checked even when it has been exhausted or replaced.

Moreover, since in the second embodiment a 1-byte check sum area is previously ensured and the first RAM area 3A is checked using a check sum method, the space for the RAM 3 required for checking is also reduced.

From the foregoing description, it can be seen that the present invention comprises an improved camera capable of detecting a power interruption in the camera. It will be appreciated by those skilled in the art that obvious changes could be made to the embodiments described in the foregoing description without departing from the broad inventive concept thereof. It is understood, therefore, that this invention is not limited to the particular embodiments disclosed, but is intended to cover all modifications thereof which are within the scope of the invention as defined by the appended claims.

What is claimed is:

1. A detecting circuit for detecting a power interruption in a battery-powered electrical device, the detecting circuit comprising: first storage means for storing first data used in operating the electrical device and for retaining the first data irrespective of a power interruption in the electrical device; second storage means powered by the battery for storing second data, the second data being dependent upon the first data; detecting means for detecting a change in the second data indicative of a power interruption in the electrical device; initialization means for initializing the electrical device in accordance with an output of the detecting means; and copying means for copying the first data stored in the first storage means into the second storage means; wherein the detecting means comprises comparing means for comparing the first data stored in the first storage means with the second data stored in the second storage means and generating an output indicative of a difference between the first and second data, and the initialization means includes means for initializing the electrical device in accordance with the output generated by the comparing means and means for inverting the first data stored in the first storage means and copying the inverted first data into the second storage means as the second data.

2. A detecting circuit for detecting a power interruption in a battery-powered electrical device, the detecting circuit comprising: readable and writable storage means powered by the battery, the storage means including a first storage area for storing first data and a second storage area for storing second data; copying means for copying the first data stored in the first storage area into the second storage area as the second data; comparing means for comparing the first data with the second data and for generating an output when there is an inconsistency between the first and second data indicative of a power source interruption; and initialization for initializing the electrical device in accordance with the output generated by the comparing means, the initialization means including means for inverting the first data stored in the first storage area and copying the inverted first data into the second storage means as the second data.

3. A method for detecting a power source interruption in a battery-powered electrical device, comprising the steps of: storing first data in a first storage area of a readable and writable storage means powered by the battery; copying a the first data stored in the first storage area into a second storage area of the storage means as second data; comparing the first data with the second data; and initializing the electrical device in accordance with a result of the comparison of the first and second data, the initializing step including inverting the first data stored in the first storage area and copying the inverted first data into the second storage area as the second data.

4. A method according to claim 3; wherein the copying step includes copying a complement value of the first data into the second storage area of the storage means as the second data.

* * * * *